US012547747B2

(12) United States Patent
Gaganam et al.

(10) Patent No.: US 12,547,747 B2
(45) Date of Patent: Feb. 10, 2026

(54) METHOD AND SYSTEM FOR SECURE HUMAN INCLUSION IN DIGITAL TWIN SIMULATIONS

(71) Applicant: Dell Products L.P., Round Rock, TX (US)

(72) Inventors: Madhukar Gaganam, Leander, TX (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 18/644,699

(22) Filed: Apr. 24, 2024

(65) Prior Publication Data

US 2025/0335613 A1    Oct. 30, 2025

(51) Int. Cl.
*H04L 29/06* (2006.01)
*G06F 21/62* (2013.01)

(52) U.S. Cl.
CPC .................................. *G06F 21/62* (2013.01)

(58) Field of Classification Search
CPC ....................................................... G06F 21/62
See application file for complete search history.

(56) References Cited

U.S. PATENT DOCUMENTS

| 12,008,089 | B1 * | 6/2024 | Lorenzen | G06F 21/31 |
| 12,452,247 | B1 * | 10/2025 | Pavnoji | H04L 63/0807 |
| 2019/0392457 | A1 * | 12/2019 | Kuntagod | H04W 12/009 |

* cited by examiner

*Primary Examiner* — Jason K Gee
(74) *Attorney, Agent, or Firm* — Chamberlain, Hrdlicka, White, Williams & Aughtry; Aly Z. Dossa

(57) ABSTRACT

A method for managing a state of a user includes: receiving a first dataset from a client, in which the user performs an activity using the client; obtaining a second dataset from a database; analyzing the first dataset and the second dataset to generate a unique digital identifier (DI) for the user; analyzing, based on a predetermined threshold, the first dataset and the second dataset to extract relevant data; making a determination that the predetermined threshold is violated; providing, based on the determination, the relevant data and the unique DI to a first infrastructure node (IN); in response to the providing, receiving a recommendation from the first IN to mitigate an issue associated with the user, in which the recommendation is generated for the unique DI; and sending the recommendation to the client to manage the state of the user.

20 Claims, 5 Drawing Sheets

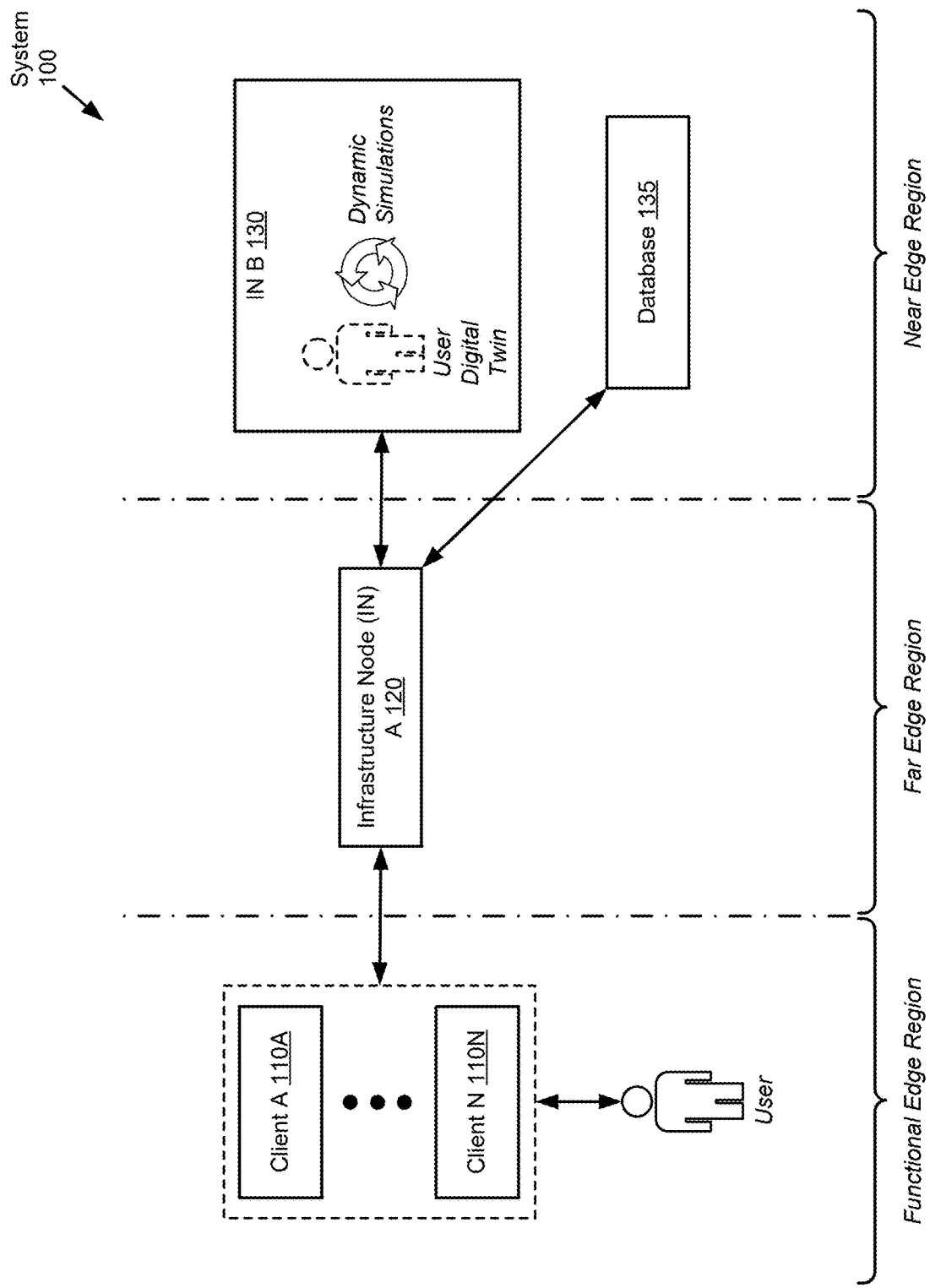
FIG. 1.1

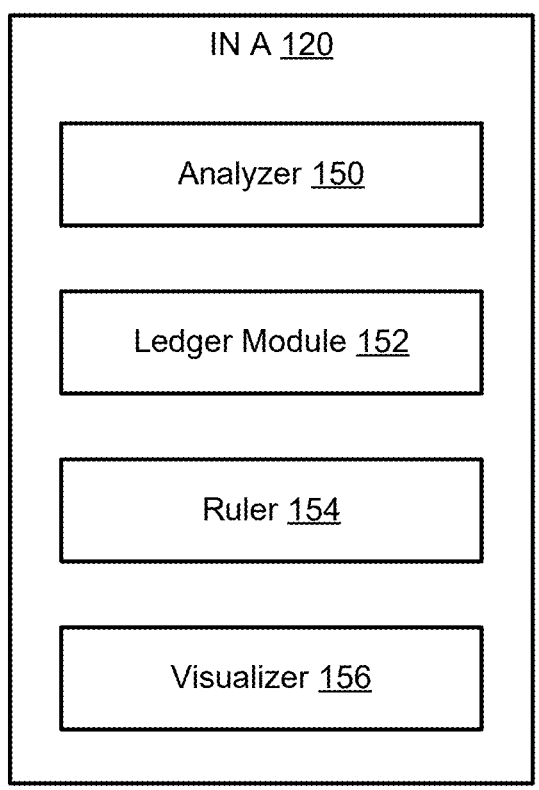
FIG. 1.2

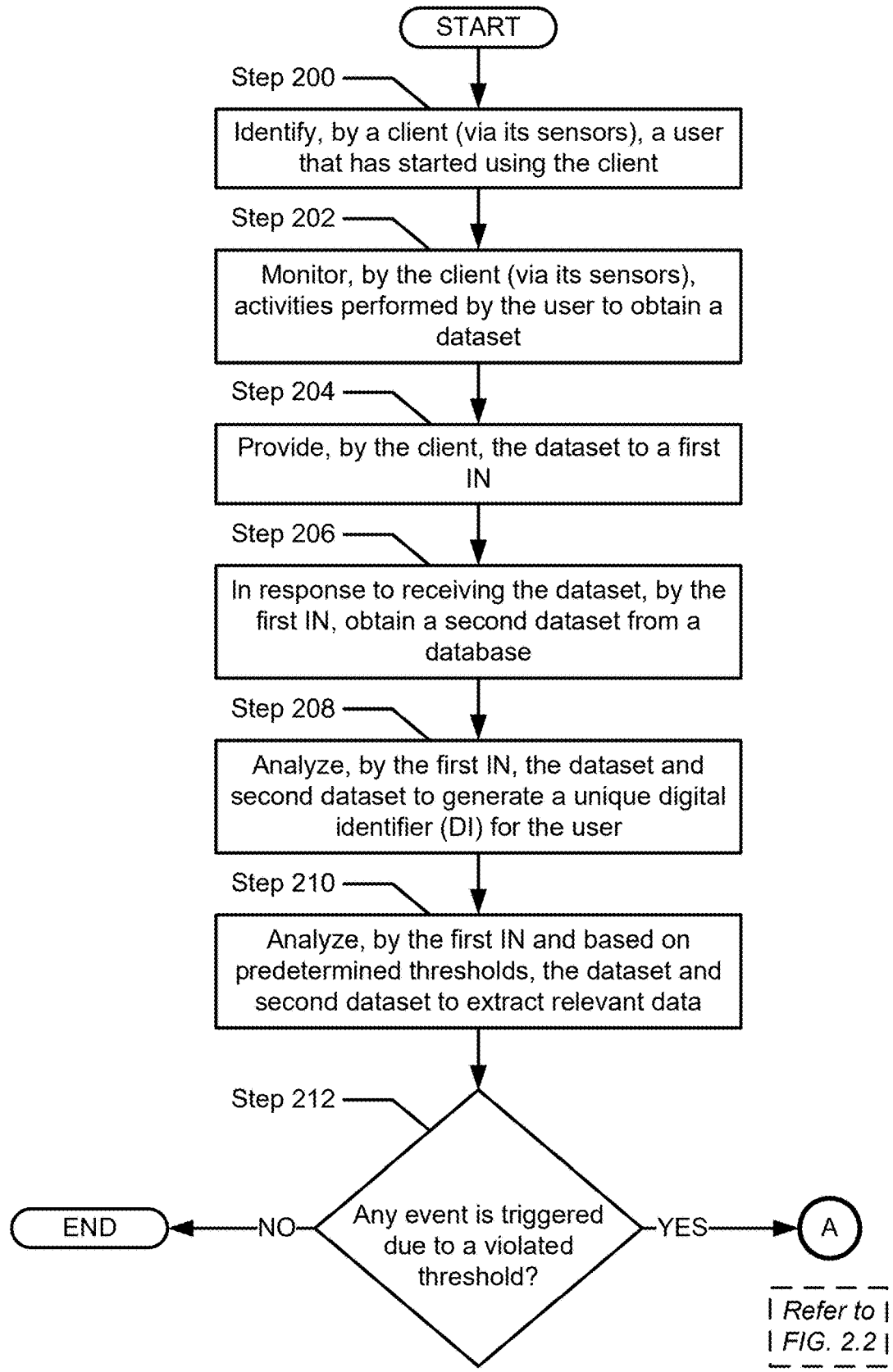
FIG. 2.1

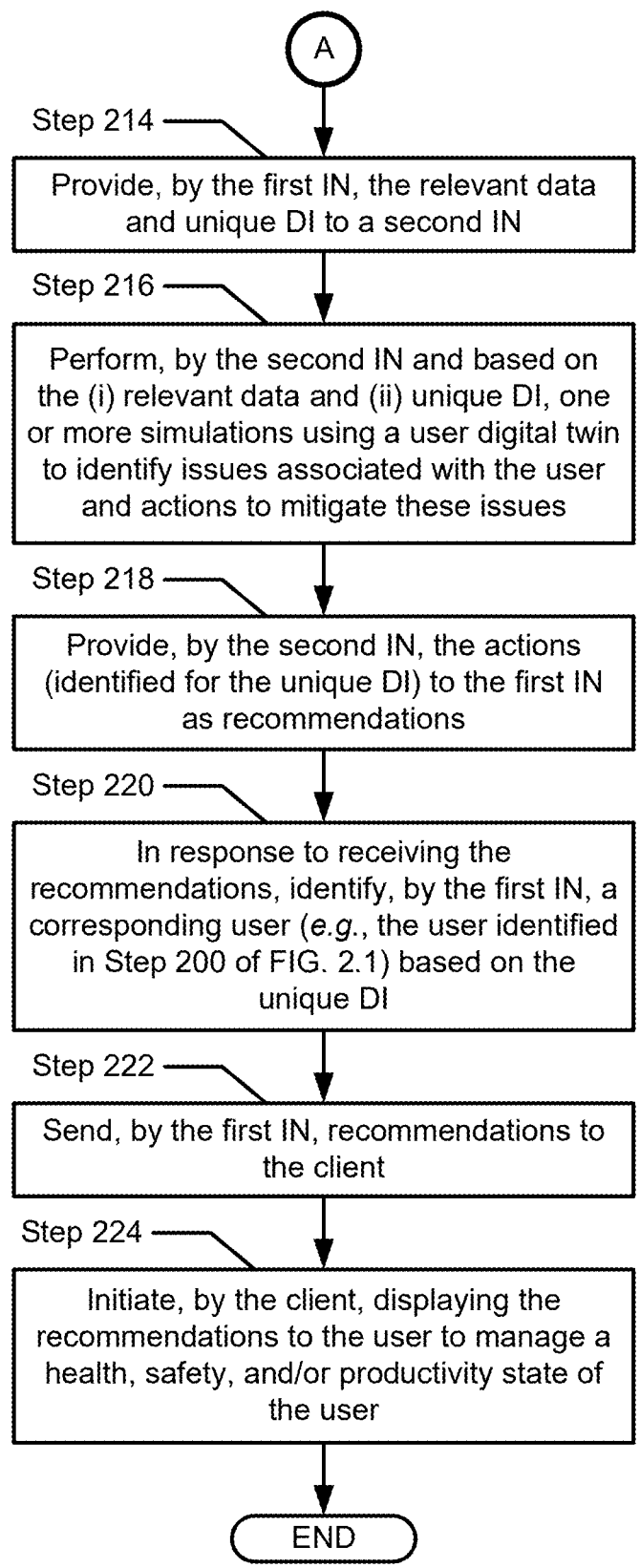
FIG. 2.2

METHOD AND SYSTEM FOR SECURE HUMAN INCLUSION IN DIGITAL TWIN SIMULATIONS

BACKGROUND

Computing devices may include any number of internal components such as processors, memory, and persistent storage. Data sent between computing devices may be subject to undesired exposure to additional computing devices. Computing devices may implement security measures in an attempt to reduce the undesired exposure.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 shows a diagram of a system in accordance with one or more embodiments disclosed herein.

FIG. 1.2 shows a diagram of an infrastructure node in accordance with one or more embodiments disclosed herein.

FIGS. 2.1 and 2.2 show a method for managing an overall state of a user (e.g., a human) in accordance with one or more embodiments disclosed herein.

DETAILED DESCRIPTION

Figure 3:
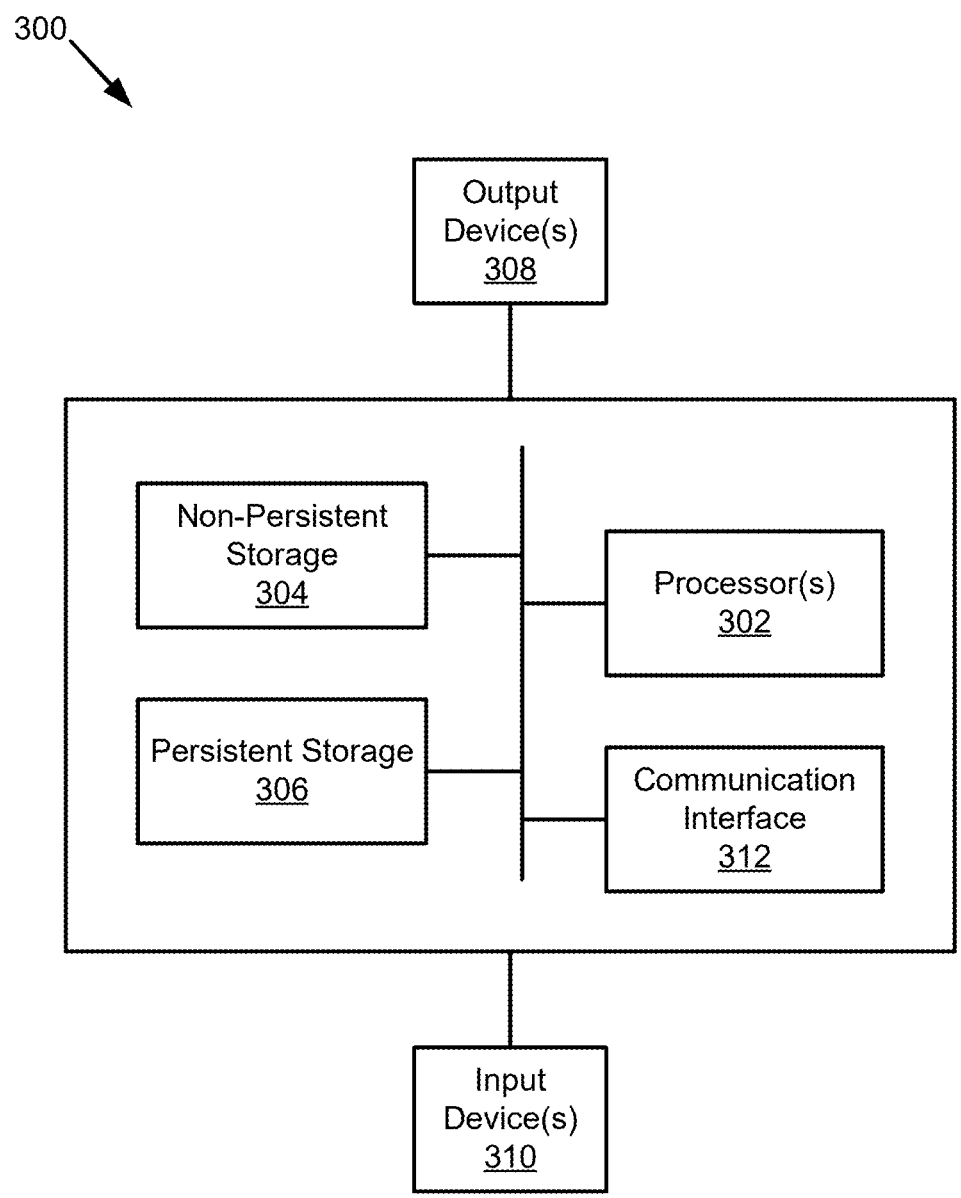
FIG. 3 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, when leveraging human health, safety, and/or productivity data in digital twin (e.g., an entity's digital/virtual replica, an entity's software version/model, etc.) dynamic simulations to (i) improve/optimize health, safety, and/or productivity of an entity and/or (ii) to identify one or more proactive actions (e.g., recommendations), individual privacy (e.g., privacy of a corresponding user/subject), secure data communication, latency during data communication, scalability requirements, secure computation offloading, and/or complying to organizational and/or government regulations/acts/standards are at risk and this needs to be resolved.

For at least the reasons discussed above and without requiring resource-intensive efforts (e.g., time, engineering, etc.), a fundamentally different approach/framework is needed (e.g., a framework that, at least, (i) generates a unique digital identifier for each user (or human subject), (ii) operates based on configurable, verifiable, and observable human data feed criteria (HDFC), and (iii) leverages blockchain (or distributed ledger) technology for (a) managing digital identifiers and HDFC and (b) securing data related to human health, safety, and productivity used in digital twin dynamic simulations.

Embodiments disclosed herein relate to methods and systems for securing human inclusion in digital twin simulations. As a result of the processes discussed below, one or more embodiments disclosed herein advantageously ensure that: (i) a digital identifier application (e.g., a ledger module (e.g., 152, FIG. 1.2)) is established to utilize data from employee data repository (e.g., a database (e.g., 135, FIG. 1.1)) and data from Internet of Things (IoT) devices (e.g., sensors, cameras, wearables, edge devices, clients (e.g., 110A, etc.), etc.) in order to generate a unique digital identifier (e.g., a key) for each user; (ii) an HDFC application (e.g., a ruler (e.g., 154, FIG. 1.2)) is established to collect and/or aggregate data based on HDFC (or predefined rules) for use in digital twin dynamic simulations; (iii) the HDFC is configurable, verifiable, and observable by an authorized entity (e.g., an administrator); (iv) blockchain technology is leveraged for managing unique digital identifiers and the HDFC; (v) a validated computing device is deployed at a far edge region for data security and to prevent any impact because of physical and/or logical tampering by unauthorized personnel; (vi) an inferencing application (e.g., an analyzer (e.g., 150, FIG. 1.2)) is established for triggering events and/or pushing data to a corresponding user digital twin to perform dynamic simulations; (vii) the framework applies to all digital twins (modelled for human-machine interactions) that are required to include diverse operational personas; (viii) data related to user health, safety, and/or productivity are secured so that the data can be used by user digital twins without facing data privacy issues; (ix) secure and easier mapping of user data (or human related data) to unique criteria (e.g., HDFC, which is generated based on consensus) is provided; (x) based on operational preferences and with the help of the decentralized nature of the framework, a simpler way of managing user data is provided (e.g., for a better administrator/user experience); (xi) the "edge computing" based framework addresses latency, data security, and scalability concerns (e.g., an ability collect stress levels of a user today and fatigue levels of that user tomorrow) to proactively manage user health, safety, and/or productivity risks at, for example, manufacturing and assembly sites/plants; (xii) administrators not need to invest most of their time and engineering efforts to understand issues faced by employees/users and to find solutions to those issues; (xiii) without the requirement of resource-intensive efforts, useful and detailed insights are extracted from, at least, users' activities; (xiv) based on the extracted insights (e.g., based on the results of dynamic simulations), issues related to a specific user are managed proactively by providing smart recommendations to that user; (xv) based on the extracted insights, a user's failure journey can be interpreted (a) to manage a potentially problematic future state (e.g., a health state, a safety state, a productivity state, etc.) of the user for a better user management and development and (b) to proactively help other users that indicate similar (or the same) states; (xvi) based on the extracted insights, administrators can identify a user profile of a user more in-depth in order to provide a better user experience to the user; (xvii) based on the extracted insights, administrators can identify a device profile of a device (e.g., an edge device, a client, etc.) that is used by a user; and/or (xviii) based on the extracted insights, administrators can invest most of their time and engineering efforts to enhance resilience of, for example, a corresponding manufacturing and assembly site.

The following describes various embodiments disclosed herein.

FIG. 1.1 shows a diagram of a system (100) in accordance with one or more embodiments disclosed herein. The system (100) includes any number of clients (e.g., Client A (110A), Client N (110N), etc.), a network (not shown), any number of infrastructure nodes (INs) (e.g., IN A (120), IN B (130), etc.), and a database (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the clients (e.g., 110A, 110N, etc.), the INs (e.g., 120, 130, etc.), the network, and the database (135) may be (or may include) physical hardware or logical devices, as discussed below. While FIG. 1.1 shows a specific configuration of the system (100), other configurations may be used without departing from the scope of the embodiments disclosed herein. For example, although the clients (e.g., 110A, 110N, etc.) and IN A (120) are described as operatively connected through a communication network, the clients (e.g., 110A, 110N, etc.) and IN A (120) may be directly connected (e.g., without an intervening communication network).

As yet another example, although the clients (e.g., the edge devices) are shown as deployed to a "functional edge region" of the system (100), IN A (120) is shown as deployed to a "far edge region" of the system (100), and IN B (130) and the database (135) are shown as deployed to a "near edge region" of the system (100), the system (100) may include another region (e.g., another logical layer) in between the far edge region and the near edge region.

As yet another example, in one embodiment, a functional edge region (where the actual functioning happens such as, for example, a user uses a client to make a product or to deliver a service), a far edge region (including, at least, compute, storage, and/or network access devices focused on data acquisition and processing), and a near edge region of the system (100) may be co-located in one site/factory, and, in another embodiment, the functional edge and far edge regions may be co-located in one site and the near edge region may represent a "cloud" environment (or a cloud computing environment). In this example, the near edge region may be far away from the functional edge and far edge regions where the near edge region may represent a centralized and geographically distant cloud environment (e.g., an environment that is hundreds of miles away from the site). Further, in this example, the database (135) and IN B (130) may be some of the cloud devices that execute on the cloud environment.

Further, in the aforementioned example, even though the functional edge and far edge regions are described as co-located in one site and the near edge region is described as representing a cloud environment, the system (100) may include another region/layer (e.g., a fog layer) in between the far edge region and near edge region. In one or more embodiments, the fog layer may include one or more "fog" devices, similar to IN A (120), in which both the fog devices and IN A (120) perform distributed computing and focus on the physical deployment of compute and storage resources in relation to data that is being produced (e.g., the difference is a matter of where those resources are located such as edge computing refers to computational processes being done at or near the "edge" of an IoT network, whereas fog computing refers to the network connections between an edge node (e.g., 120) and a cloud device (e.g., 130) to extend the cloud device closer to the edge of the IoT network).

In one or more embodiments, each component (e.g., 110A, 120, 130, 135, etc.) of the system (100) may be a part of a business operation region (BOR) (not shown) of an organization, in which the BOR corresponds to a geographic region (e.g., a zone, a city, a county, a state, a province, a country, a country grouping (e.g., the European Union), etc.). For example, IN A (120) of Organization X may be located in Austin, Texas and IN B (130) of Organization X may be located in the Netherlands, in which Organization X has multiple geographically distributed INs (e.g., edge nodes) around the world.

In one or more embodiments, in one architecture (e.g., the "unidirectional" architecture), one of the edge nodes (e.g., the parent edge node) of an organization may be deployed to the United States, which serves (e.g., shares) data to/among the remaining edge nodes (e.g., the child edge nodes that are deployed to Argentina, India, and France) of the organization. In this architecture, the child edge nodes may transmit their data to the parent edge node so that the parent edge node stays updated. Thereafter, the parent edge node may distribute/forward received data to the child edge nodes to keep the child edge nodes equally updated.

In another architecture (e.g., the "bidirectional" architecture), one of the edge nodes of an organization may be deployed to Greece and the other one may be deployed to Spain, in which both edge nodes know each other and when a data change is occurred in one of them, the other edge node may automatically obtain that data to stay updated.

In another architecture (e.g., the "multidirectional" architecture), an organization may have multiple edge nodes deployed around the world and all of the edge nodes know each other. When one of the edge nodes is updated (e.g., when that edge node receives a software package), the remaining edge nodes are updated accordingly (e.g., by sending a data transfer request to each of the remaining edge nodes).

Further, for example, the functioning of the clients (e.g., 110A, 110N, etc.) and IN A (120) is not dependent upon the functioning and/or existence of the other components (e.g., devices) in the system (100). Rather, the clients and IN A (120) may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 300, FIG. 3) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using IN A (120) and/or IN B (130)). By doing so, the users may utilize different computing devices (e.g., 300, FIG. 3) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being an edge device, a client (e.g., 110A, 110N, etc.) may include functionality to, e.g.: (i) capture sensory input (e.g., sensor data) in the form of text, audio, video, touch or motion; (ii) collect massive amounts of data at the edge of an IoT network (where the collected data may be grouped as: (a) data that needs no further action and does not need to be stored, (b) data that should be retained for later analysis and/or record keeping, and (c) data that requires an immediate action/response); (iii) provide to other entities (e.g., an edge node, IN A (120), etc.), store, or otherwise utilize captured sensor data (and/or any other type and/or quantity of data); and/or (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to, for example, IN A (120). As being, for example, a sensing device, each of the clients may be adapted to provide monitoring services. For example, a client may monitor objects disposed in a scene. The monitoring may be performed by obtaining sensor data from sensors that are adapted to obtain information regarding the scene, in which a client may include and/or be operatively coupled to one or more sensors (e.g., physical devices adapted to obtain information regarding one or more scenes).

In one or more embodiments, sensor data may include (or specify) any quantity and types of measurements (e.g., of a scene's properties, of an environment's properties, etc.) over any period(s) of time and/or at any points-in-time (e.g., any types of information obtained from one or more sensors, in which different portions of the sensor data may be associated with different periods of time). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the embodiments disclosed herein. For example, the sensor data may be implemented as a tree, a table, a linked list, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), an application executable or code, an application configuration, a hardware resources configuration, a supporting services configuration, a network connectivity configuration, etc.

As used herein, a "policy" is a collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups in connection with embodiments disclosed herein may include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to users, the clients (e.g., 110A, 110N, etc.) may utilize, rely on, or otherwise cooperate with IN A (120). For example, the clients may issue requests to IN A (120) to receive responses and interact with various components of IN A (120). The clients may also request data from and/or send data to IN A (120) (for example, the clients may transmit information to IN A (120) that allows IN A (120) to perform computations, the results of which are used by the clients to provide services to the users). As yet another example, the clients may utilize computer-implemented services provided by IN A (120). When the clients interact with IN A (120), data that is relevant to the clients may be stored (temporarily or permanently) in IN A (120).

In one or more embodiments, a client (e.g., 110A, 110N, etc.) may be capable of, e.g.: (i) collecting users' inputs; (ii)

correlating collected users' inputs to the computer-implemented services to be provided to the users; (iii) communicating with IN A (120) that performs computations necessary to provide the computer-implemented services; (iv) using the computations performed by IN A (120) to provide the computer-implemented services in a manner that appears (to the users) to be performed locally to the users; and/or (v) communicating with any virtual desktop (VD) in a virtual desktop infrastructure (VDI) environment (or a virtualized architecture) provided by IN A (120) (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., IN A (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, a computer numerical control (CNC) machine, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Further, in one or more embodiments, a client (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, IN A (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, through the concept of edge computing, some of the computational loads (assigned to, for example, Client A (110A)) may be moved towards to IN A (120) to harness computational capabilities of IN A (120), which are located closer (for example, one-hop away from Client A (110A)) to users to reduce possible network latency (for example, for mission critical and/or latency-sensitive applications).

In one or more embodiments, edge computing may provide one or more advantages with respect to, for example (but not limited to): computation standards to complement the computations performed on cloud devices; benchmarking and marketplace; frameworks and languages; lightweight libraries and models; micro OSs and virtualization; decentralized cloud devices and low-latency computing; surmounting resource limitations of the clients (e.g., 110A, 110N, etc.); sustainable energy consumption; capability to deal with data explosion and network traffic; making real-time (or near real-time) decisions on numerous data streams that are generated by the clients (e.g., a latency-sensitive visual guiding service (provided by a wearable camera) may have a preferred response time between 25 ms to 50 ms); data processing at the periphery of an IoT network (e.g., as close to the originating source as possible, rather than transmitting raw data to cloud devices for processing and analysis); distinguishing different types of raw data obtained from the clients; identifying what level of response is required for each type of data; etc.

In one or more embodiments, IN A (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to, for example, the database (135) for management of the data and/or for storage of the data (while pushing the data, IN A (120) may include information regarding a source of the data (e.g., an identifier of the source) so that such information may be used to associate provided data with one or more of users (or data owners)); (v) host and maintain various workloads; (vi) provide a computing environment whereon workloads may be implemented (e.g., employing linear, non-linear, and/or machine learning (ML) models to perform cloud-based data processing); (vii) provide power management strategies to prevent overloading of cloud devices (e.g., IN B (130)) with trivial tasks (e.g., by performing those tasks without significant energy implications); (viii) reduce the response time of the clients by minimizing the volume of network traffic to the cloud devices or by distributing traffic in the network; (ix) incorporate strategies (e.g., strategies to provide VDI capabilities) for remotely enhancing capabilities of the clients; (x) provide robust security features to the clients and make sure that a minimum level of service is always provided to a user of a client; and/or (ix) transmit the result(s) of the computing work performed (e.g., real-time business insights, equipment maintenance predictions, other actionable responses, etc.) to another IN (not shown) for review and/or other human interactions.

Further, IN A (120) may include functionality to, e.g.: (i) reduce latency and the amount of on-cloud computations; (ii) reduce networking costs, especially for wireless cellular connections; (iii) when outlier data appears in data obtained from a client, perform an action to provide a real-time response to local events occurred in the client; (iv) monitor operational states of the clients; (v) regularly back up configuration information of the clients to a long-term storage device; (vi) in response to a power failure (or a potential power failure), communicate with a second IN in the system (100) and obtain any region/location information of that IN to determine whether that IN is available to process data obtained from one or more clients; (vii) provide (e.g., via a broadcast, multicast, or unicast mechanism) information (e.g., a location identifier, the amount of available resources, etc.) associated with itself to other INs in the system (100); (viii) configure or control any mechanism that defines when, how, and what data to provide to IN B (130); (ix) manage operations of one or more clients to improve their operations (e.g., improve the quality of data being generated, decrease the cost of generating data, etc.); (x) exchange data with other devices registered in/to the network in order to, for example, participate in a collaborative workload placement (e.g., IN A (120) may split up a request (e.g., an operation, a task, an activity, etc.) with another IN, coordinating its efforts to complete the request more efficiently than if IN A (120) had been responsible for completing the request); (xi) provide software-defined data protection for the clients; (xii) provide automated data discovery, protection, management, and recovery operations for the clients; (xiii) provide data deduplication; (xiv) orchestrate data protection through one or more GUIs; (xv) empower data owners (e.g., users of the clients) to perform self-service data backup and restore operations from their native applications; (xvi) ensure compliance and satisfy different types of service level objectives (SLOs) set by an administrator; (xvii) increase resiliency of an organization by enabling rapid recovery or cloud disaster recovery from cyber incidents; (xviii) provide operational simplicity, agility, and flexibility for physical, virtual, and cloud-native environments; (xix) consolidate multiple operation requests (received from, for example, the clients) so that duplicative operations (which may not be useful for restoration purposes) are not generated; and/or (xx) initiate multiple operations in parallel (e.g., IN A (120) may host multiple operations, in which each of the multiple operations may (a) manage the initiation of a respective operation and (b) operate concurrently to initiate the multiple operations).

One of ordinary skill will appreciate that IN A (120) may perform other functionalities without departing from the scope of the embodiments disclosed herein.

In one or more embodiments, once data is (and/or will be) provided by a client (e.g., 110A, 110N, etc.) to IN A (120), users of the client may desire access to the data managed by IN A (120). To facilitate provisioning of access to the aforementioned data, IN A (120) may manage one or more data structures, such as a blockchain, that includes information regarding data ownership, information regarding the data, information regarding the users (e.g., data owners), and/or information regarding how the users may access the data.

In one or more embodiments, by providing data management services and/or operational management services (in conjunction with IN B (130)) to users and/or other entities, IN A (120) may enable any number of entities to access data. As part of providing the data management services, IN A (120) may provide a secure method for storing and accessing data (via the ledger module). Additionally, the method of securely storing and accessing data may facilitate providing access to the data. By doing so, access to data in the system (100) may be provided securely while facilitating provisioning of access to the data.

As described above, IN A (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage operations of the network, in which the clients are operably connected to IN A (120). Specifically, the service manager (i) may identify services to be provided by IN A (120) (for example, based on the number of users using the clients) and (ii) may limit communications of the clients to receive IN A (120) provided services.

For example, the priority (e.g., the user access level) of a user may be used to determine how to manage computing resources of IN A (120) to provide services to that user. As yet another example, the priority of a user may be used to identify the services that need to be provided to that user. As yet another example, the priority of a user may be used to determine how quickly communications (for the purposes of providing services in cooperation with the network (and its subcomponents)) are to be processed by the network.

Further, consider a scenario where a first user is to be treated as a normal user (e.g., a non-privileged user, a user with a user access level/tier of 4/10). In such a scenario, the user level of that user may indicate that certain ports (of the subcomponents of the network corresponding to communication protocols such as the TCP, the UDP, etc.) are to be opened, other ports are to be blocked/disabled so that (i) certain services are to be provided to the user by IN A (120) (e.g., while the computing resources of IN A (120) may be capable of providing/performing any number of remote computer-implemented services, they may be limited in providing some of the services over the network) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) IN A (120) may provide more services to the second user and (ii) network traffic from that user is to be afforded a high-level of quality (e.g., a higher processing rate than the traffic from the normal user).

As discussed above, IN A (120) (via its analyzer)) may monitor operational states of the client (e.g., 110A, 110N, etc.). An operational state of a client may correspond to the ability of the client to perform predetermined functionalities (e.g., obtaining information regarding a scene associated with the client). For example, monitoring of the operational states of the clients may be used to determine whether it is likely that the monitoring of the scenes by the clients results in information regarding the scenes that accurately reflects the states of the scenes (e.g., a damaged client may provide inaccurate information regarding a monitored scene). Said another way, by providing monitoring services, IN A (120) may be able to determine whether a client (e.g., 110A, 110N, etc.) is malfunctioning (e.g., due to a damage to the client, due to a malicious action (e.g., hacking, a physical attack, etc.) performed on the client by third-parties, etc.).

If the client is not in a predetermined operational state (e.g., if the client is malfunctioning), in conjunction with IN B (130), IN A (120) may take actions to remediate the client. Remediating the client may result in the client being placed in the predetermined operational state, which improves, for example, the likelihood that monitoring of a scene by the client results in the generation of accurate information regarding the scene.

In one or more embodiments, in order to provide the above-mentioned functionalities (e.g., in order to read, write, and/or store data), IN A (120) may need to communicate with other components of the system (100) with minimum amount of latency (e.g., with high-throughput (e.g., a high data transfer rate) and sub-ms latency). For this reason, representational state transfer application programming interfaces (REST APIs) may be used to enable communication(s) between IN A (120) and the other components.

In one or more embodiments, IN A (120) may be a heterogeneous set, including different types of hardware components (e.g., hardware resource sets, a collection of physical components, hardware and software resource sets, etc.), software components (e.g., a collection of logical components), and/or OSs. Comparing to IN B (130), IN A (120) may have relatively limited hardware and/or software resources. In one or more embodiments, IN A (120) may be, for example (but not limited to): a physical computing device, a router, a switch, an industrial gateway, a network device with routing or switching functionality, a small/macro base station, a small server, a programmable logic controller, etc.

Further, while a single IN (e.g., 120) is considered in the far edge region, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other INs may provide a second computer-implemented service cooperatively (e.g., each of the multiple other INs may provide similar and or different services that form the cooperatively provided service).

In one or more embodiments, to provide any quantity and any type of computer-implemented services, IN A (120) may utilize computing resources provided by various hardware components and/or logical components (e.g., virtualization resources). A computing resource (e.g., a measurable quantity of a compute-relevant resource type that may be requested, allocated, and/or consumed) may be (or include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc.

In one or more embodiments, computing resources of IN A (120) may be divided into three logical resource sets: a compute resource set, a control resource set, and a hardware resource set. Different resource sets, or portions thereof, from the same or different INs may be aggregated (e.g., caused to operate as a computing device) to instantiate "composed" IN A (120) including at least one of the resource sets.

In one or more embodiments, a control resource set (e.g., of an IN, of an external resource, etc.) may facilitate formation of "composed" IN A (120). To do so, a control resource set may prepare any quantity of computing resources from any number of hardware resource sets (e.g., of the corresponding INs) for presentation. Once prepared, the control resource set may present the prepared computing resources as bare metal resources to an orchestrator (not shown) of the system (100). By doing so, "composed" IN A (120) may be instantiated.

To prepare the computing resources of the hardware resource sets for presentation, the control resource set may employ, for example, virtualization, indirection, abstraction, and/or emulation. These management functionalities may be transparent to applications/modules hosted by the resulting "composed" IN A (120) (e.g., thereby relieving those applications from workload overhead). Consequently, while unknown to components of "composed" IN A (120), IN A (120) may operate in accordance with any number of management models.

In one or more embodiments, the orchestrator may implement a management model to manage the aforementioned computing resources (e.g., computing resources provided by one or more hardware components of INs in the system (100)) in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

In one or more embodiments, a compute resource set, a control resource set, and/or a hardware resource set may be implemented as separate physical components. In such a scenario, any of these resource sets may include NICs or other devices to enable the hardware devices of the respective resource sets to communicate with each other.

As discussed above, computing resources of an IN may be divided into three logical resource sets (e.g., a compute resource set, a control resource set, and a hardware resource set). By logically dividing the computing resources of an IN into these resource sets, different quantities and types of computing resources may be allocated to a "composed" IN thereby enabling the resources allocated to the respective IN to match performed workloads. Further, dividing the computing resources in accordance with a "three set" model may enable different resource sets to be differentiated (e.g., given different personalities) to provide different functionalities. Consequently, INs may be composed on the basis of desired functionalities rather than just on the basis of aggregate resources to be included in the composed INs.

In one or more embodiments, IN A (120) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of IN A (120) described throughout the application.

Alternatively, in one or more embodiments, similar to a client (e.g., 110A, 110N, etc.), IN A (120) may also be implemented as a logical device.

In one or more embodiments, IN A (120) may host the analyzer, the ledger module, the ruler, and a visualizer (e.g., 156, FIG. 1.2). Additional details of the analyzer, the ledger module, the ruler, and the visualizer are described below in reference to FIG. 1.2. In the embodiments of the present disclosure, the database (135) is demonstrated as a separate entity from IN B (130); however, embodiments disclosed herein are not limited as such. The database (135) may be demonstrated as a part of IN B (130) (e.g., as deployed to IN B (130)).

In one or more embodiments, IN B (130) may be a heterogeneous set, including different types of hardware components (e.g., hardware resource sets, a collection of physical components, hardware and software resource sets, etc.), software components (e.g., a collection of logical components), and/or OSs. Comparing to IN A (120), IN B (130) may (i) provide less, the same, or more functionalities and/or services and (ii) have relatively more hardware and/or software resources (or capabilities) to perform heavier computational tasks (e.g., training ML models, deploying ML models, executing ML models, storing larger amount of data, etc.). In one or more embodiments, IN B (130) may be, for example (but not limited to): a physical computing device, a small data center in a factory, a cloud device, a manufacturing execution sub-system, etc.

In one or more embodiments, IN B (130) may, at least, host a user digital twin (or a human digital twin) and perform one or more dynamic simulations using the user digital twin (e.g., to predict potential risks/issues associated with a corresponding user that operates at the functional edge region, to remediate those issues, etc.). For example, a user digital twin (illustrated with dashed lines) may be a real-time representation of a user (using a client (e.g., 110A) deployed to the functional edge region) that is configured to emulate/simulate the user. An emulation of the user may be used for identifying one or more actions/strategies need to be applied by the user and for measuring corresponding metrics before sending these actions to the user and/or a corresponding administrator. In one or more embodiments, IN B (130) may host diverse operational user digital twins (or human personas) at the same time and may execute corresponding dynamic simulations accordingly.

In one or more embodiments, as being a digital model/application of a human (e.g., a model that represents, at least, human anatomy of a specific user), a user digital twin of a particular user may include all relevant information about that user. For example, depending on User F's role (e.g., a manufacturing operator), a suitable user digital twin can be selected for User F and, after providing data associated with the ergonomics of User F to this user digital twin, the twin can decide which task should be assigned to User F. As yet another example, depending on User X's role, a suitable user digital twin can be selected for User X and, after providing data associated with User X (obtained from a corresponding client and the database (135)) to this user digital twin, the twin can find an action to remediate a low productivity state of User X.

In one or more embodiments, before performing its duties, a user digital twin may first go through a modeling phase using training data (said another way, a user digital twin may be a model based on specific modeling data that is decided by a corresponding organization based on, for example, a location of the organization, cultures of people in that location, regulations that need to be followed in that location, etc.). The modeling phase may be performed at different points-in-time, may be performed repeatedly (e.g., performing modeling, then monitoring, then modeling, then monitoring, etc.), or may otherwise be utilized to provide a user digital twin's functionality.

In one or more embodiments, if a user digital twin (that is generated and employed by IN B (130)) is not operating properly (e.g., is not providing the functionalities discussed along the application), the user digital twin may be re-modeled using any form of training/trained data and/or the user digital twin may be updated periodically as there are improvements in the underlying models. In one or more embodiments, in order to dynamically change/modify the user digital twin's behavior, the trained data may be generated and provided by a set of linear, non-linear, and/or ML/artificial intelligence (AI) models.

One of ordinary skill will appreciate that IN B (130) may perform other functionalities without departing from the scope of the embodiments disclosed herein.

In one or more embodiments, IN B (130) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of IN B (130) described throughout the application.

Alternatively, in one or more embodiments, similar to a client (e.g., 110A, 110N, etc.), IN B (130) may also be implemented as a logical device.

In one or more embodiments, all, or a portion, of the components of the system (100) may be operably connected to each other and/or other entities via any combination of wired and/or wireless connections. For example, the aforementioned components may be operably connected, at least in part, via the network. Further, all, or a portion, of the components of the system (100) may interact with one another using any combination of wired and/or wireless communication protocols.

In one or more embodiments, the network may represent a (decentralized or distributed) computing network and/or fabric configured for computing resource and/or messages exchange among registered computing devices (e.g., the clients, IN A (120), IN B (130), the database (135), etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network may enable interactions between, for example, the clients and IN A (120) through any number and type of wired and/or wireless network protocols (e.g., TCP, UDP, IPv4, etc.).

The network may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network and its subcomponents may be implemented using hardware, software, or any combination thereof.

In one or more embodiments, before communicating data over the network, the data may first be broken into smaller batches (e.g., data packets) so that larger size data can be communicated efficiently. For this reason, the network-enabled subcomponents may break data into data packets. The network-enabled subcomponents may then route each data packet in the network to distribute network traffic uniformly.

In one or more embodiments, the network-enabled subcomponents may decide how real-time (e.g., on the order of ms or less) network traffic and non-real-time network traffic should be managed in the network. In one or more embodiments, the real-time network traffic may be high-priority (e.g., urgent, immediate, etc.) network traffic. For this reason, data packets of the real-time network traffic may need to be prioritized in the network. The real-time network traffic may include data packets related to, for example (but not limited to): videoconferencing, web browsing, voice over Internet Protocol (VOIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may represent an employee data repository (or an employee information source) that includes personal information provided to a corresponding company for managing, for example, a lifecycle of an employee from hiring to leaving the company. To this end, the database (135) may store unstructured and/or structured data that may include (or specify), for example (but not limited to): an identifier of a user/employee/customer (e.g., a unique string or combination of bits associated with a particular user); information related to an area that an employee assigned to work for a period of time; information related to an administrator that manages one or more employees; an identifier of that administrator; information related to certificates (e.g., security certificates) that an employee needs to obtain; a cumulative history of certificates obtained by an employee over a prolonged period of time; biometrics (or biometric information such as, for example, age, disability, height, etc.) of an employee; a work preference requested by an employee (e.g., Employee A wants to work during a day shift, Employee B wants to work during a night shift, etc.); information related to a role of an employee (e.g., a junior developer, an operator, a technician, a maintenance engineer, a quality engineer, a supervisor, a factory manager, a temporary engineer, a permanent engineer, a knowledge employee, a power employee, a task employee with relatively low-end compute requirements, a task employee that requires a rich multimedia experience, etc.); a cumulative history of promotions received by an employee over a prolonged period of time; salary information of an employee; information related to performance of an employee; information related to experience of an employee; information related to a skill level of an employee; information related to daily tasks assigned to an employee; a request received from an employee (or an employee's account); a valid (e.g., a granted) request and its corresponding details; a geographic location (e.g., a country) associated with an employee; an invalid (e.g., a rejected) request and its corresponding details; a timestamp showing when a specific request is processed by an application; recently obtained employee activity records; a cumulative history of employee activity records obtained over a prolonged period of time; one or more lists that specify which computer-implemented services should be provided to which employee (depending on a user access level of that employee); data for execution of applications/services (including IN A (120) applications and associated end-points); corpuses of annotated data used to build/generate and train processing classifiers for trained ML models (e.g., user digital twins); linear, non-linear, and/or ML model parameters (e.g., instructions to IN B (130) on how to train and/or tune a model); a distributed model identifier that uniquely identifies a distributed model; recently obtained employee information (e.g., records, credentials, etc.) of an employee; a cumulative history of initiated model training operations (e.g., sessions) over a prolonged period of time; a number of each type of a set of assets protected by an IN (e.g., 120, 130, etc.); a size of each of the set of assets protected; configuration information associated with each component of IN A (120) (to manage security, network traffic, network access, or any other function/operation performed by those components); configuration information associated with each component of IN B (130) (to manage security, network traffic, network access, or any other function/operation performed by those components); a job detail of a job (e.g., a data protection job, a data restoration job, a log retention job, etc.) that has been initiated by an IN (e.g., 120, 130, etc.); a type of the job (e.g., a non-parallel processing job, a parallel processing job, an analytics job, etc.); information associated with a hardware resource set (described below) of an IN (e.g., 120, 130, etc.); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; a cumulative history of initiated data backup operations over a prolonged period of time; a cumulative history of initiated data restore operations over a prolonged period of time; information regarding an administrator (e.g., a high priority trusted administrator, a low priority trusted administrator, etc.) related to an analytics job; a practice recommended by a vendor (e.g., a single data protection policy should not protect more than 100 assets; for a dynamic NAS, maximum one billion files can be protected per day, etc.); one or more states (e.g., a health state, a safety state, a productivity state, etc.) of an employee; a previously recorded stress level of an employee; a set of SLAs (e.g., an agreement that indicates a period of time required to retain a profile of an employee); a profile of a valid employee; a profile of an invalid employee; a fraud report associated with an employee; vaccination credentials of an employee; etc.

Based on the aforementioned data, for example, the analyzer (e.g., 150, FIG. 1.2) may perform employee analytics to infer profiles of employees communicating with the clients (e.g., 110A, 110N, etc.).

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for IN A (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage I/O option (e.g., a list of possible file system block sizes across all target file systems), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per IN in the system (100), a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer employee information is received, a state of an employee is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1.1 shows a configuration of components, other system configurations may be used without departing from the scope of the embodiments disclosed herein.

Turning now to FIG. 1.2, FIG. 1.2 shows a diagram of IN A (120) in accordance with one or more embodiments disclosed herein. IN A (120) includes the analyzer (150), the ledger module (152), the ruler (154), and the visualizer (156). IN A (120) may include additional, fewer, and/or different components without departing from the scope of the embodiments disclosed herein. Each component may be operably connected to any of the other component via any combination of wired and/or wireless connections. Each component illustrated in FIG. 1.2 is discussed below.

In one or more embodiments, the analyzer (150) may include functionality to, e.g.: (i) receive/obtain a first dataset (described below) from a client (e.g., 110A, FIG. 1.1) to get a logical view of, at least, a state of a user that is already certified to use the client; (ii) in response to receiving the first dataset (generated, for example, by cameras and/or sensors of a related client), obtain a second dataset (described below) from the database (e.g., 135, FIG. 1.1); (iii) send the first dataset and second dataset to the ledger module (152); (iv) obtain predetermined thresholds (described below) from the ruler (154); (v) by employing a linear model, a non-linear model, and/or a ML model and based on the predetermined thresholds (e.g., HDFC), analyze the first dataset and second dataset to extract relevant data (to infer, at least, health, safety, and productivity/performance states of the user); (vi) by employing a linear model, a non-linear model, and/or a ML model and based on the relevant data, automatically react and generate events/alerts if one of the predetermined thresholds is violated; (vii) make a determination whether or not any event/alert is triggered with respect to the user; (viii) based on (vii), obtain a unique digital identifier associated with the user (generated by the ledger module (152)); (ix) provide the relevant data (including at least the health, safety, and productivity/performance states of the user), triggered events, and unique digital identifier of the user to IN B (e.g., 130, FIG. 1.1) (more specifically, to a user digital twin of the user hosted by IN B) in order to manage an overall state of the user; (x) receive recommendations (see Step 218 of FIG. 2.2) from IN B; (xi) in response to receiving the recommendations and in conjunction with the ledger module (152), identify the user based on the unique digital identifier; and/or (xii) send the recommendations to a corresponding client.

In one or more embodiments, a first dataset may include (or specify), for example (but not limited to): an identifier of a user; one or more details of incoming request/call/network traffic to a client (e.g., content of the intercepted data packets, information regarding a sender (e.g., a malicious user, a high-priority trusted user, a low-priority trusted user, etc.), information regarding the size of intercepted data packets, etc.); a port number associated with a hardware component of a client; a protocol type associated with a port number; computing resource details (including details of hardware components and/or software components) and IP address details of a client; one or more details of outgoing request/call/network traffic from a client (e.g., content of the outgoing data packets, information regarding a targeted destination, information regarding the size of outgoing data packets, etc.); historical sensor data/input (e.g., visual sensor data (such as heartbeat rate of a user), audio sensor data, electromagnetic radiation sensor data, temperature sensor data, humidity sensor data, corrosion sensor data, etc., in the form of text, audio, video, touch, and/or motion) and its corresponding details; an identifier of a data item or an asset (e.g., a file, a folder, etc.); the size of that data item; a mapping table that shows the mappings between incoming request/call/network traffic and outgoing request/call/network traffic; recently obtained user activity records; an identifier of an application; information with respect to historical metadata (e.g., system logs, applications logs, telemetry data, etc.) associated with a client; a cumulative history of network traffic logs obtained (by a client) over a prolonged period of time; previously received malicious data access requests from an invalid user; one or more points-in-time and/or one or more periods of time associated with a data recovery event; a backup history documentation of a workload; one or more lists that specify which computer-implemented services should be provided to which user (depending on a user access level of a user); one or more policies/rules/settings for the operation (or configuration) of any portion of a corresponding client (to manage security, network traffic, network access, or any other function/operation performed by the client); an identifier of a hardware component (e.g., a sensor); a product identifier of a client; a type of a client; a setting (and a version) of a mission critical application executing on a client; an SLA/SLO set by an employee/user; a restore history documentation of a workload; a data protection policy (e.g., an affinity-based backup policy) implemented by a user; a configuration setting of that policy; product configuration information associated with a client; a number of each type of a set of data protection policies implemented by a user; an amount of storage used by an application; an identifier of a client's manufacturer; etc.

In one or more embodiments, as being telemetry data, a system log (e.g., a file that records system activities across hardware and/or software components of a client) may include (or specify), for example (but not limited to): a type of an asset (e.g., a type of a workload such as an SQL database, a NAS executing on-premises, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., input/output operations executed by the microservice per second); media access control (MAC) information of a client; an amount of bare metal communication executed by a client (e.g., input/output operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof.

In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, a user, etc.) has already or is likely to, in the future, be no longer able to provide the services that the entity has previously provided. The health state determination may be made via any method based on the aggregated health information without departing from the scope of the embodiments disclosed herein.

In one or more embodiments, a priority class may be based on, for example (but not limited to): an application's tolerance for downtime, a size of an application, a relationship (e.g., a dependency) of an application to other applications, etc. Applications may be classified based on each application's tolerance for downtime. For example, based on the classification, an application may be assigned to one of three classes such as Class I, Class II, and Class III. A "Class I" application may be an application that cannot tolerate downtime. A "Class II" application may be an application that can tolerate a period of downtime (e.g., an hour or other period of time determined by an administrator or a user). A "Class III" application may be an application that can tolerate any amount of downtime.

In one or more embodiments, the second dataset may include (or specify), for example (but not limited to): an identifier of a user; an identifier of a user's supervisor; a picture of a user; information related to a previously assigned job to a user; a role of a user; information that shows a user's experience (or experience level); information that shows disabilities of a user; a work time preference of a user; a user's age; a previously recorded stress level of a user; etc. Based on data available in the database (e.g., 135, FIG. 1.1), the second dataset may specify other information without departing from the scope of the embodiments disclosed herein.

In one or more embodiments, relevant data may specify (or include), for example (but not limited to): "Client A being used by User A during the last five hours (where User A did not take a break and needs to stand up to use Client A)"; "User B was motivated as of 8:00; however, as of 11:00, User B seems unmotivated and stressed"; a health status (e.g., healthy, unhealthy, etc.) of a client (e.g., 110A, FIG. 1); a continuous average resource utilization value with respect to each computing resource of the client; minimum and maximum resource utilization values with respect to each computing resource of the client; a health status of each component (of the client) based on average, minimum, and maximum resource utilization values; "comparing to yesterday, User X seems unmotivated because User X still could not finish 50% of his/her workload as of 15:00"; "User Y seems frustrated because he/she did not follow his/her administrator's comments with respect to operating procedures of Client R"; information regarding how a client has been utilized by a user; etc.

In one or more embodiments, predetermined thresholds (generated by the ruler (154)) may specify, for example (but not limited to): "Client A can only be used for three hours without taking a break"; "User B can only work during a day shift and only finish ten minor and five larger tasks during the day shift"; "Client C cannot be used alone"; "Client D can only be used after getting an administrator's approval"; "User K can only work during a night shift and only finish seven larger tasks during the night shift"; "a stress level of a user that uses Client T cannot exceed 60%"; "a motivation level of a junior engineer should not be lower than 70%"; "a fatigue level of a user that uses Client F cannot exceed 40%"; "Client D cannot be used by a user who has a disability (e.g., not being able to lift machine parts that weigh over 30 kilograms)"; "Client G cannot be used by a user who is older than forty years old (because this user may need to be standing up more than seven hours during his/her work time)"; "a smoke level that is being generated by Client K cannot exceed level 3 (e.g., to protect users' health)"; "Client P can only be used by a user that has at least three years of experience for using Client P"; etc.

One of ordinary skill will appreciate that the analyzer (150) may perform other functionalities without departing from the scope of the embodiments disclosed herein. The analyzer (150) may be implemented using hardware (e.g., a physical device including circuitry), software, or any combination thereof.

In one or more embodiments, as being a lightweight blockchain module, the ledger module (152) may include functionality to, e.g.: (i) employ one or more features of blockchain technology (e.g., technology that is based on a distributed ledger) to manage authentication, access control, secure offloading, and sharing of data ((a) data obtained from, for example, one or more clients (e.g., 110A, FIG. 1.1), the database (e.g., 135, FIG. 1.1), etc., and/or (b) predetermined thresholds that are set by the ruler (154)) to other entities in the system (e.g., 100, FIG. 1.1); (ii) upon receiving a first dataset and a second dataset from the analyzer (150) and by employing one or more features of blockchain technology, generate a unique digital identifier (e.g., a unique number, a 128-bit key, a 192-bit key, a 256-bit key, a smart contract, etc.) for a user (to keep the actual credentials of the user anonymous for, at least, privacy purposes); (iii) in conjunction with the analyzer (150) and in response to receiving a recommendation from a corresponding user digital twin, identify a corresponding user based on its unique digital identifier; (iv) make IN A (e.g., 120, FIG. 1.1) a tamper-proof computing device (e.g., a device that a user cannot access (to read/write data) unless the user has an access voucher); (v) depending on a user policy, as soon as a user finishes his/her task on a corresponding client, delete the unique digital identifier assigned to the user previously; (vi) in order to protect sensitive data from unauthorized access (for example, prior to transfer over a public network), encrypt the data (e.g., using a symmetric encryption or an asymmetric encryption); (vii) act as a key management sub-system (or a lockbox) to generate, keep, transmit, and/or reliably forget cryptographic keys (e.g., to perform key related operations); (viii) act as a random number generator to generate cryptographic keys (e.g., encryption keys, decryption keys, time-based keys, etc.) for use in encrypting/decrypting data items; (ix) perform data protection related (or key related) operations (e.g., key management operations, key policy operations, key introduction operations, re-keying operations, etc.); and/or (x) store immutable entries (where each entry may specify an agreement between two entities and, optionally, an indication about whether the agreement was fulfilled).

In one or more embodiments, a unique digital identifier may be a smart contract (or a key) between two entities. For example, after authenticating a user, the ledger module (152) may generate a smart contract between the user and its user digital twin to enable/authorize data sharing between them. Said another way, a smart contract may include a contractual term negotiated between the user and its user digital twin, in which the contractual term may be implemented as a subroutine that uses at least security level audit information to enforce the contractual term.

In one or more embodiments, the ledger module (152) may be a part of a blockchain network (not shown), which may refer to a decentralized peer-to-peer (p2p) network. In a decentralized p2p network, information may be distributed across and continually reconciled by various computing systems, instead of being maintained by a central authority. Subsequently, a decentralized p2p network may lack centralized points of vulnerability, which may be exploited, and, therefore, exhibits no central point of failure. In one or more embodiments, the blockchain network may include multiple blockchain nodes (e.g., ledger modules) operatively connected to one another through the network (described above in reference to FIG. 1.1).

In one or more embodiments, a blockchain node (e.g., the ledger module (152)) may be any computing device (e.g., 300, FIG. 3) that participates in implementing the blockchain network. In participating in the implementation of the blockchain network, each blockchain node may maintain a copy of a distributed database, i.e., a blockchain, which tracks transactions between blockchain nodes. In one or more embodiments, each blockchain node may play the role of, at least, a cloud security provider (CSP).

In the blockchain network, a CSP may fulfill the role of offering security level services in exchange for recompense. To that end, a CSP may include an API, one or more security levels, a security level manager (SLM), a block validator (BV), a contract handler (CH), a transaction generator (TG), a data repository, and a blockchain virtual machine (BVM). Each of these components is described below.

In one or more embodiments, the API may be a hardware and/or software implemented construct that employs a set of subroutine definitions, protocols, and/or tools for enabling communications, information exchange, and/or resource sharing between a CSP and other blockchain nodes, apprising different roles, across the blockchain network. Further, the API may include functionality to: receive API requests from another blockchain node; and defer processing of the API requests to one or more other components of the CSP.

In one or more embodiments, the security levels may refer to tiers of security protection that a CSP may be prepared to offer in exchange for recompense. Security levels may encompass data level security (DLS), virtualization level security (VLS), management level security (MLS), network level security (NLS), and infrastructure level security (ILS).

In one or more embodiments, a DLS may refer to digital security and privacy protection measures directed to safeguarding, for example, computing data and applications. These protection measures may either be preventative or reactive. A preventative data protection measure may refer to a mechanism that averts security and privacy breaches, pertaining to data and applications, before they take place. Meanwhile, a reactive data protection measure may refer to a mechanism that responds to and resolves security and privacy breaches, pertaining to data and applications, while they may be occurring or after they have taken place. Examples of the DLS measures may include, but not limited to: data flow analytics; data governance; encryption key management; data masking and/or redaction; database activity monitoring; data loss prevention; encryption; database access control; fraud detection; vulnerability correlation; hybrid scanning; web application protection; source code scanning; application scanning; etc.

In one or more embodiments, a VLS may refer to digital security and privacy protection measures directed to safeguarding, for example, computing virtualization resources. By way of examples, virtualization resources may encompass virtual machines and containers. These protection measures may either be preventative or reactive. A preventative virtualization protection measure may refer to a mechanism that averts security and privacy breaches, pertaining to virtualization resources, before they take place. Meanwhile, a reactive virtualization protection measure may refer to a mechanism that responds to and resolves security and privacy breaches, pertaining to virtualization resources, while they may be occurring or after they have taken place. Examples of the VLS measures may include, but not limited to: VM or container isolation; data access control; residual information protection; data encryption storage; malicious VM or container prevention; virtual firewalls; hypervisor management; patch management; etc.

In one or more embodiments, an MLS may refer to digital security and privacy protection measures directed to safeguarding, for example, computing management. These protection measures may either be preventative or reactive. A preventative management protection measure may refer to a mechanism that averts security and privacy breaches, pertaining to management, before they take place. Meanwhile, a reactive management protection measure may refer to a mechanism that responds to and resolves security and privacy breaches, pertaining to management, while they may be occurring or after they have taken place. Examples of the MLS measures may include, but not limited to: centralized user management; management authentication; log auditing; risk management and compliance; identity and access management; etc.

In one or more embodiments, an NLS may refer to digital security and privacy protection measures directed to safeguarding, for example, computing networking and connectivity. These protection measures may either be preventative or reactive. A preventative networking protection measure may refer to a mechanism that averts security and privacy breaches, pertaining to networking and connectivity, before they take place. Meanwhile, a reactive management protection measure may refer to a mechanism that responds to and resolves security and privacy breaches, pertaining to networking and connectivity, while they may be occurring or after they have taken place. Examples of the NLS measures may include, but not limited to: network intrusion detection systems (IDSs); network intrusion prevention systems (IPSs); firewalls; anti-Distributed Denial of Service (DDoS) technologies and policies; network plane isolation; logical network segmentation; spoofing monitoring; transmission security protocols; etc.

In one or more embodiments, an ILS may refer to digital security and privacy protection measures directed to safeguarding, for example, a computing infrastructure. These protection measures may either be preventative or reactive. A preventative infrastructure protection measure may refer to a mechanism that averts security and privacy breaches, pertaining to infrastructure, before they take place. Meanwhile, a reactive infrastructure protection measure may refer to a mechanism that responds to and resolves security and privacy breaches, pertaining to infrastructure, while they may be occurring or after they have taken place. Examples of the ILS measures may include, but not limited to: system integrity protection; OS reinforcement; virus protection; multi-faceted network protection; anomaly detection; hardened systems integration; asset management; perimeter security; trust overlay and reputation systems integration; etc.

Continuing with the discussion, in one or more embodiments, the BV may be a computer program or a computer process (i.e., an instance of a computer program) that executes on the underlying hardware of the CSP (i.e., the ledger module (152)). Specifically, the BV may be a computer program/process tasked with validating proposed blocks. Proposed blocks, when validated, become actual blocks that may be appended to the blockchain distributed across the blockchain network. To that end, the BV may include functionality to: receive proposed blocks; and determine whether the proposed blocks are valid or invalid based on header information enclosed in the proposed blocks.

In one or more embodiments, the CH may be a computer program or a computer process that executes on the underlying hardware of the CSP. Specifically, the CH may be a computer program/process tasked with managing any processes involving smart contracts between the ledger module (152) and other blockchain nodes. To that end, the CH may include functionality to: generate smart contracts based on received requests; compile smart contracts into byte-code; and trigger the execution and/or fulfillment of smart contracts.

In one or more embodiments, the TG may be a computer program or a computer process that executes on the underlying hardware of the CSP. Specifically, the TG may be a computer program/process tasked with issuing various types of transactions. To that end, the TG may include functionality to: generate token transfer transactions (TTTs); generate new contract transactions (NCTs); generate contract execution transactions (CETs); sign these various transaction types; and broadcast these various transaction types, via the API, to one or more peer blockchain nodes throughout the blockchain network.

In one or more embodiments, information consolidated in the data repository may include, but not limited to, user/administrator and/or contract account information. User account information may refer to a set of data objects or variables that pertain to a user of the blockchain network (i.e., an operator of a blockchain node). Further, user account information may enable a user to authenticate to the blockchain network. On the other hand, contract account information may refer to a set of data objects or variables that pertain to a smart contract adopted by the blockchain network.

In one or more embodiments, the BVM may be a runtime environment for smart contracts across the blockchain network. That is, the BVM may be a sandboxed virtual stack machine responsible for executing smart contract byte-code, which may be obtained through the compilation of smart contracts. Further, the BVM may also be employed for the execution of various transactions between blockchain nodes across the blockchain network. Towards executing smart contracts and/or transactions, the state, data, and/or computer readable program code for the smart contracts and/or transactions may be stored in a local blockchain copy (LBC) (not shown)—i.e., a local copy of the distributed database or ledger used throughout the blockchain network to track transactions.

In one or more embodiments, an LBC may refer to a data structure that may be replicated across the blockchain nodes of the blockchain network. Specifically, an LBC may be a chain of blocks, in which each block represents a set of one or more transactions that have been vetted by the blockchain network.

In one or more embodiments, asymmetric encryption keys (a private key and a public key) may be used in the authentication of transactions signed by a blockchain network user associated with the ledger module (152). To sign a transaction, the blockchain network user may use the private key to encrypt the transaction. Thereafter, the encrypted or signed transaction may subsequently be broadcasted across the blockchain network, where it may be received by one or more other blockchain nodes. In receiving the signed transaction, another blockchain network user may authenticate the signed transaction using the public key, which may have been published or distributed across the blockchain network prior to or during broadcasting of the signed transaction.

In one or more embodiments, a smart contract may be a computer program (stored on a blockchain) that specifies and enforces contractual terms, negotiated between blockchain network users (e.g., a security requestor and a security provider), for the exchange of resources, services, and/or recompense. Similar to a class in various programming languages, a smart contract may include, for example (but not limited to): a contract name; one or more contract variables; one or more contract functions; zero or more contract events; etc.

In one or more embodiments, a contract name may be an alphanumeric character string that refers to an identifying designation for the smart contract. A contract variable may refer to a static or dynamic value that may be manipulated, or otherwise used, by one or more subroutines specified in the smart contract. Contract variables may also be referred herein as contract states. Further, a contract function may refer to a sequence of computer instructions, expressed as computer readable program code, which when executed, may perform tasks pertinent to declaring and enforcing the contractual terms negotiated between blockchain node users specified in the smart contract. A contract function may, for example, enable the smart contract to interact with other smart contracts, make decisions, store information, and transfer tokens to one or more network user accounts or other smart contract accounts.

Further, a contract event may refer to a special subroutine that triggers a response from an entity operating external to the blockchain. Specifically, when the smart contract calls upon or emits a contract event, external entities listen for these events, which can also pass one or more arguments. The external entities, subsequently, based on the detecting of a contract event and using any passed arguments, may perform tasks that the smart contract itself cannot natively execute because of its isolated nature within the blockchain.

By way of an example, contract events may enable a smart contract to attain security level audit information from a third-party security testing service. Security level audit information may refer to assessment information regarding the security level(s) procured by a security requestor from a security provider. For example, security level audit information may specify: (a) a security requestor address; (b) a security provider address; and (c) an SLA based on third-party penetration testing targeting a computing device, pertaining to the security requestor, on which security protection tier(s), serviced by a security provider, should be applied. Furthermore, a smart contract may use security level audit information to enforce contractual terms, specified in the smart contract, which have been negotiated between the security requestor and the security provider.

One of ordinary skill will appreciate that the ledger module (152) may perform other functionalities without departing from the scope of the embodiments disclosed herein. The ledger module (152) may be implemented using hardware, software, or any combination thereof.

In one or more embodiments, the ruler (154) may include functionality to, e.g.: (i) generate predetermined thresholds (e.g., HDFC, where the HDFC may be related to role, stress, skill level, motivation, disability, personality, experience, and/or certification attributes of a user) with data classification for individual user data sets; (ii) re-configure a predetermined threshold based on a request (more specifically, the ruler (154) ensures that the HDFC is configurable, verifiable, and observable by authorized users); (iii) enable secure and easier mapping of user/human related data to a threshold (that is decided to be generated based on consensus, for example, among administrators of a related site); (iv) upon request, provide predetermined thresholds to the analyzer (150) so that the analyzer (150) can make a determination whether or not any event is triggered due to a violated threshold; and/or (v) provide storage options (e.g., long-term storage, short-term storage, etc.) to retain the predetermined thresholds.

In one or more embodiments, the ruler (154) may generate the predetermined thresholds for each user (after getting an approval from each user) and/or client (e.g., 110A, FIG. 1.1) (i) by complying to regulations/acts/standards (or compliance related parameters), and (ii) to manage each user's health, security, and productivity states. The predetermined thresholds may be maintained by the ruler (154). The ruler (154) may add, remove, and/or modify information included in a threshold to cause the information to reflect, for example, the latest condition/state of a user. The predetermined thresholds may be implemented using, for example, lists, tables, unstructured data, structured data, etc. While described as being stored locally, the predetermined thresholds may be stored remotely and may be distributed across any number of devices without departing from the scope of the embodiments disclosed herein.

In one or more embodiments, a compliance related parameter may include (or specify), for example (but not limited to): a General Data Protection Regulation (GDPR) compliance requirement (e.g., different "types" personal data may require different levels of protection, for example, sensitive data (e.g., health data, biometrics data, genetic data, criminal history data, etc.) may be subject to the highest levels of data protection; organizations may get consent (from users or data subjects) to collect personal data (with the level of consent varying according to the type of personal data being collected); an organization that collects personal data for a targeted purpose may not use the collected data for another purpose (such as consumer profiling, which may be considered "non-compliant"); data subjects (i.e., the data subjects whose personal data is being collected) may be able to understand why their data is being collected and how it is being processed, and they may have the right to object, correct, and/or remove the data; etc.); a Sarbanes-Oxley Act (SOX) compliance requirement (e.g., prevent data tampering and monitor for breaches, document activity timelines and encrypt the data, install access tracking controls that may identify breaches, check constantly to ensure defense systems are working, analyze security system data (and improve when needed), implement real-time security breach tracking, grant auditors defense system access for complete transparency, disclose security incidents to auditors for a quick response, report technical difficulties to auditors and avoid stalls, etc.); a Health Insurance Portability and Accountability (HIPAA) compliance requirement (e.g., ensure the confidentiality, integrity, and availability of all protected health information (PHI) in any form (e.g., electronic, paper, oral, etc.); identify and protect against reasonably anticipated security threats; protect against reasonably anticipated, impermissible uses or disclosures; ensure compliance of workforce and business associates; etc.); a Payment Card Industry Data Security Standard (PCI DSS) compliance requirement (unlike HIPAA and GDPR requirements, which are based on governmental regulation(s), PCI DSS compliance requirements are contractual commitments maintained and enforced by the Payment Card Industry Security Standards Council) (e.g., build and maintain a secure network and system; protect cardholder data; maintain a vulnerability management program (e.g., quarterly vulnerability scans, annuals assessments, etc.); implement strong access control measures; regularly monitor and test networks; maintain an information security policy; etc.); a California Consumer Privacy Act (CCPA) compliance requirement (e.g., users may have the right to know what personal data is collected or sold (and for what purpose); users may have access to personal data, to request its deletion, and/or to opt-out being collected or sold; users may have the right to sue companies for data breaches and for privacy failures; etc.); a Personal Information Protection and Electronic Documents Act (PIPEDA) compliance requirement (e.g., an organization may need to obtain its users' consent prior to data collection; an organization may need to uphold transparent personal data policies, and limit data collection to clear and specific purposes; users may need to have the right to access their data and to challenge its accuracy; organizations may be held accountable for data loss or theft; organizations may need to disclose security breaches of personal data to individuals who affected by the breach; etc.); etc.

One of ordinary skill will appreciate that the ruler (154) may perform other functionalities without departing from the scope of the embodiments disclosed herein. The ruler (154) may be implemented using hardware, software, or any combination thereof.

In one or more embodiments, the analyzer (150) may initiate, for example, displaying of (i) one or more problematic users (e.g., unhealthy users, unsafe users, nonproductive users, etc.), (ii) a root cause of a problem associated with a corresponding user, (iii) identified/tagged health of a corresponding client, (iv) a holistic user profile of a user, and/or (v) analyzer generated alerts to an administrator via the visualizer (156) (e.g., via a GUI, an API, a human-machine interface, and/or a communication channel of the visualizer) to indicate (i) an overall state of a user and (ii) an overall state of a corresponding client (e.g., 110A, FIG. 1.1). In one or more embodiments, for example, (i) each data item (e.g., a holistic user profile/state of a user, a root cause of a problem associated with a corresponding user, an analyzer generated alert, etc.) may be displayed (e.g., highlighted, visually indicated, etc.) with a different color (e.g., red color tones may represent a negative overall state of a user, green color tones may represent a positive overall state of a user, etc.), and (ii) one or more useful insights/recommendations with respect to an overall state of a user may be displayed in a separate window(s) on the visualizer (156) to assist the administrator while managing the overall state of the user (e.g., for a better administrator experience, to help the administrator with respect to understanding the benefits and trade-offs of selecting different troubleshooting options, etc.).

Further, the visualizer (156) may include functionality to, e.g.: (i) obtain (or receive) data (e.g., any type and/or quantity of input) from any source (e.g., a user via a client (e.g., 110A, FIG. 1), the analyzer (150), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by IN A (120) to operate as a service over the network so that the visualizer (156) may be used externally; (iv) employ a set of subroutine definitions, protocols, and/or hardware/software components for enabling/facilitating communications between, for example, the analyzer (150) and external entities (e.g., clients, administrators, etc.); (v) by generating one or more visual elements, allow an administrator to, at least, interact with a user of a corresponding client; (vi) receive a customer/user profile of a customer and display the customer profile to an administrator (e.g., for monitoring and/or performance evaluation); (vii) concurrently display one or more separate windows on, for example, its GUI; and/or (viii) generate visualizations of methods illustrated in FIGS. 2.1 and 2.2.

One of ordinary skill will appreciate that the visualizer (156) may perform other functionalities without departing from the scope of the embodiments disclosed herein. The visualizer (156) may be implemented using hardware, software, or any combination thereof.

In one or more embodiments, the analyzer (150), the ledger module (152), the ruler (154), and the visualizer (156) may be utilized in isolation and/or in combination to provide the aforementioned functionalities. These functionalities may be invoked using any communication model including, for example, message passing, state sharing, memory sharing, etc. By doing so, IN A (120) (in conjunction with IN B (e.g., 130, FIG. 1.1)) may proactively address issues related to an overall state of a user.

FIGS. 2.1 and 2.2 show a method for managing an overall state of a user in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2.1, the method shown in FIG. 2.1 may be executed by, for example, the above-discussed client (e.g., 110A, FIG. 1.1) and IN A (e.g., 120, FIG. 1.1). Other components of the system (100) illustrated in FIG. 1.1 may also execute all or part of the method shown in FIG. 2.1 without departing from the scope of the embodiments disclosed herein.

In Step 200, the client identifies, via its sensors (described above in reference to FIG. 1.1) a user that has started using the client. Upon identifying the user, as part of that identification, and/or in any other manner (e.g., before allowing the user to use the client), the client may check/determine whether or not the user is certified/approved to use the client (more specifically, the client may check whether or not the user is a valid/authorized/trusted user or has necessary credentials to use the client).

Based on the check, the client may, at least: (i) tag the user as a valid user; (ii) tag the user as an invalid user (e.g., a malicious insider, a negligent insider, a data thief, etc.); and (iii) based on (ii), reject (by taking preventive/proactive policy actions) access of the invalid user to the client (so that unauthorized entities cannot access to business-critical data within the client) and send a relevant notification to the invalid user (and a corresponding administrator).

As used herein, (i) a "malicious insider" is a user who intentionally hurt the organization, whether through data theft or by sabotage, (ii) a "negligent insider" is a user who unintentionally put the organization's security at risk, and (iii) a "credential/data thief" is an outside infiltrator who enters the organization through, for example, an employee account.

In Step 202, after completing the check, the client monitors (or tracks in real-time), via its sensors, activities performed by the user to obtain a first dataset. Certain exemplary details of the first dataset have been described above in reference to FIG. 1.2.

In Step 204, the client provides the first dataset to IN A (more specifically, to the analyzer (e.g., 150, FIG. 1.2)). In one or more embodiments, upon receiving/obtaining the first dataset, the analyzer may need to, for example (but not limited to): inventory a type and a model of the client; obtain a version of firmware or other code executing on the client; obtain information regarding a computing resource that has been allocated to the client; obtain information specifying the client's interaction with one another; etc.

In one or more embodiments, the first dataset may be obtained (or dynamically fetched) as they become available (e.g., with no user manual intervention), or by the analyzer polling the client (by making schedule-driven/periodic API calls to the client without affecting the client's ongoing production workloads) for newer data. Based on receiving the API calls from the analyzer, the client may allow the analyzer to obtain the first dataset.

In one or more embodiments, the first dataset may be obtained (e.g., may be dynamically fetched, streamed, etc.) continuously as they generated, or the dataset may be obtained in batches, for example, in scenarios where (i) the analyzer receives data analysis request (or a heath check request for the user), (ii) the client accumulates the first dataset and provides the dataset to the analyzer at fixed time intervals, or (iii) the database (e.g., 135, FIG. 1.1) stores the first dataset and notify the analyzer to access the dataset from the database. In one or more embodiments, the first dataset may be access-protected for transmission from the client to the analyzer, e.g., using encryption.

In one or more embodiments, after receiving/obtaining the first dataset, the analyzer may analyze data included in the first dataset with respect to: (a) velocity (e.g., how often a corresponding sensor collected stress level data associated with the user (e.g., every five minutes, every ten minutes, etc.), (b) veracity (e.g., how trustworthy the collected fatigue level data associated with the user), (c) volume (e.g., how much data collected with respect to the user), and (d) variety (e.g., what type of data collected with respect to the user (e.g., image data, audio data, video data, etc.). Based on this analysis, for example, the analyzer may infer that images of visual expression of the user over the last three hours are captured through a camera of the client.

In one or more embodiments, before moving to Step 206, the analyzer may clean the first dataset, in which cleaning the first dataset may include identifying and removing, for example, system log data items from the first dataset.

In Step 206, in response to receiving/obtaining the first dataset, IN A (more specifically, the analyzer) obtains a second dataset (associated with the user) from the database. Certain exemplary details of the second dataset have been described above in reference to FIGS. 1.1 and 1.2.

In one or more embodiments, the second dataset may be obtained (or dynamically fetched) as they become available (e.g., with no user manual intervention), or by the analyzer polling the database (by making schedule-driven/periodic API calls to the database without affecting the database's ongoing production workloads) for newer data. Based on receiving the API calls from the analyzer, the database may allow the analyzer to obtain the second dataset.

In one or more embodiments, the second dataset may be obtained (e.g., may be dynamically fetched, streamed, etc.) continuously as they generated, or the dataset may be obtained in batches, for example, in scenarios where (i) the analyzer receives data analysis request (or a heath check request for the user), (ii) the database accumulates the second dataset and provides the dataset to the analyzer at fixed time intervals, or (iii) the database stores the second dataset and notify the analyzer to access the dataset from the database. In one or more embodiments, the second dataset may be access-protected for transmission from the database to the analyzer, e.g., using encryption.

In Step 208, the analyzer sends the first dataset and the second dataset to the ledger module (e.g., 152, FIG. 1.2). Upon receiving both datasets and by employing a set of linear, non-linear, and/or ML models (e.g., a distributed ledger based model), the ledger module analyzes both datasets to generate a unique digital identifier (e.g., a smart contract) for the user. Certain exemplary details of the distributed ledger (or the distributed ledger technology) have been described above in reference to FIG. 1.2.

For example, based on a user's identifier, a corresponding administrator's identifier, user's location information, a user's picture, and/or user's assigned tasks information (specified in the datasets), the ledger module generates the unique digital identifier for the user.

In Step 210, in response to receiving/obtaining the first dataset and the second dataset, IN A (more specifically, the analyzer) obtains one or more predetermined thresholds (for the user) from the ruler (e.g., 154, FIG. 1.2). Certain exemplary details of the predetermined thresholds have been described above in reference to FIG. 1.2.

Thereafter, by employing a linear model, a non-linear model, and/or a ML model and based on the predetermined thresholds, the analyzer analyzes the first dataset and the second dataset to extract relevant data (to infer, at least, health, safety, and productivity/performance states of the user). Further, by employing a linear model, a non-linear model, and/or a ML model and based on the relevant data, the analyzer may automatically react and generate one or more events if one of the predetermined thresholds is violated.

For example, the analyzer may generate a "stress" event after detecting an anomaly in the health state of the user, in which the user is indicating a stress level increase by 10% over the last hour. As yet another example, the analyzer may generate a "fatigue" event after detecting an anomaly in the health state of the user, in which the client being used by the user over the last seven hours. As yet another example, the analyzer may generate an "unsatisfied" event after detecting an anomaly in the productivity state of the user, in which the user did not get an expected promotion because of his/her experience.

In Step 212, based on Step 210, IN A (more specifically, the analyzer) makes a determination (in real-time or near real-time) as to whether any event is triggered due to a violated threshold (associated with the user). Accordingly, in one or more embodiments, if the result of the determination is NO (where the user is tagged as a low-risk user), the method ends. If the result of the determination is YES (where the user is tagged as a high-risk user), the method alternatively proceeds to Step 214 of FIG. 2.2.

Turning now to FIG. 2.2, the method shown in FIG. 2.2 may be executed by, for example, the above-discussed client, IN A, and IN B (e.g., 130, FIG. 1.2). Other components of the system (100) illustrated in FIG. 1.1 may also execute all or part of the method shown in FIG. 2.2 without departing from the scope of the embodiments disclosed herein.

In Step 214, as a result of the determination in Step 212 of FIG. 2.1 being YES, IN A (more specifically, the analyzer) provides the relevant data (including at least the health, safety, and productivity/performance states of the user), triggered events, and unique digital identifier of the user to IN B in order to proactively manage an overall state of the user (e.g., for a better user state management). In the meantime, the analyzer may also send an emulation/simulation request (for the user) to IN B.

In Step 216, based on, at least, the simulation request, relevant data, and unique digital identifier of the user, IN B performs one or more simulations using a user digital twin of the user (i) to identify issues associated with the user and (ii) to identify actions to mitigate these issues. Certain exemplary details of a user digital twin have been described above in reference to FIG. 1.1.

For example, based on the aforementioned data received from the analyzer, the user digital twin may identify potential issues with the user while using the client (and what caused these issues (e.g., a root casus of each issue)). Thereafter, dynamic simulations performed using the user digital twin may indicate that User X's efficiency is lower than expected (e.g., User X is slowing down in terms of performance) because User X is over-assigned on a daily basis (e.g., for today's shift, User X is assigned to ten tasks). Further, the user digital twin may emulate User X by assigning five tasks and determine that (i) User X's efficiency is increased 30% and (ii) User X's stress level is reduced. Accordingly, the user digital twin may conclude that in order to manage the productivity state and health state of User X, User X has to be assigned maximum five tasks on a daily basis, and outputs this conclusion as a proactive action/strategy to take with respect to User X.

As yet another example, based on the aforementioned data received from the analyzer, the user digital twin may identify potential issues with the user while using the client (and what caused these issues). The user digital twin may infer that there is no need to perform newer simulations for User R because User R is indicating previously detected symptoms (or experiencing the same issues (e.g., experiencing extreme fatigue due to using Client T over four hours)). To this end, the user digital twin may conclude that in order to manage the productivity state and health state of User R, User R has to take a break or seek help from another certified user to transfer his/her remaining task(s), and outputs this conclusion as a proactive action to take with respect to User R.

In one or more embodiments, an action to mitigate an issue associated with the user may be determined in an iterative manner. For example, based on the aforementioned data received from the analyzer, multiple actions may be evaluated by the user digital twin to find the most efficient action for mitigating the issue.

In Step 218, IN B provides one or more actions (identified for the user via the unique digital identifier) to IN A (more specifically, to the analyzer) as recommendations (e.g., to remediate the issues associated with the user, to manage the overall state of the user, for a better user experience, etc.).

In one or more embodiments, a recommendation may specify, for example (but not limited to): "in order to manage the productivity state and health state of User X, please assign maximum five tasks (on a daily basis) to User X"; "in order to manage your productivity state and health state, please take a break or seek help from another certified user to transfer your remaining task(s)"; "in order to manage your productivity state, please uninstall a recently installed service on Client T"; "in order to manage your productivity state, please communicate with a secure protocol"; "in order to manage your productivity state, please replace GPU B of Client Y with another GPU"; "in order to manage your productivity state, please upgrade the version of Application T from version 1.2 to version 1.4 and then restart Client F"; etc.

In Step 220, in response to receiving the recommendations, IN A (more specifically, the analyzer (in conjunction with the ledger module)) identifies the user based on the unique digital identifier (generated in Step 208 of Step 2.1). In Step 222, IN A (more specifically, the analyzer) sends (in real-time or near real-time) the recommendations to the client.

In Step 224, based on Step 222, the client initiates displaying of, via its GUI, the recommendations to the user to indicate and manage the health, safety, and/or productivity states of the user. While displaying, the client may also indicate, for example (but not limited to): an overall health status of the client (including health of each component of the client), a recommendation about how to keep the client (and its components) healthy (e.g., providing one or more preventive and proactive actions in order to assist the user to rectify the detected anomalies in the client), the amount of time that has been spent while performing corresponding dynamic simulations on the corresponding user digital twin, etc.

In one or more embodiments, while displaying, the client may also indicate whether the dynamic simulations were completed within a predetermined window, or whether the simulations were completed after exceeding the predetermined window.

In one or more embodiments, the analyzer may include a recommendation monitoring service to monitor whether a provided recommendation is considered by the user. The recommendation monitoring service may be a computer program that may be executed on the underlying hardware of IN A. The recommendation monitoring service may be designed and configured to facilitate remote access to check the overall state of the user (e.g., satisfactory after implementing the provided recommendations, still unsatisfactory even after implementing the provided recommendations, etc.). Based on the monitoring, if the overall state of the user is still unsatisfactory (even after implementing the provided recommendations), the analyzer may request another recommendation (for the user) from IN B.

In one or more embodiments, the method may end following Step 224.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (610), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a state of a user, the method comprising:
   receiving a first dataset from a client, wherein the user performs an activity using the client;
   obtaining a second dataset from a database;
   analyzing the first dataset and the second dataset to generate a unique digital identifier (DI) for the user;
   analyzing, based on a predetermined threshold, the first dataset and the second dataset to extract relevant data;
   making a determination that the predetermined threshold is violated;
   providing, based on the determination, the relevant data and the unique DI to a first infrastructure node (IN);
   in response to the providing, receiving a recommendation from the first IN to mitigate an issue associated with the user, wherein the recommendation is generated for the unique DI; and
   sending the recommendation to the client to manage the state of the user.

2. The method of claim 1,
   wherein the client is deployed to a first region of a site, wherein the user operates in the first region of the site,
   wherein a second IN is deployed to a second region of the site, wherein the second IN comprises a first hardware and software resource set (HSRS),
   wherein the first IN is deployed to a third region of the site, wherein the first IN comprises a second HSRS, wherein the second HSRS provides more computing power comparing to the first HSRS in order to perform heavier computational tasks, and
   wherein the client, the first IN, and the second IN are distinct computing devices operably connected to each other over a network.

3. The method of claim 2, wherein the first HSRS specifies at least one selected from a group consisting of a minimum user count, a maximum user count, a central processing unit (CPU) count, a speed select technology configuration, a hardware virtualization configuration, and an input/output memory management unit configuration.

4. The method of claim 2, wherein the second HSRS specifies at least one selected from a group consisting of a minimum user count, a maximum user count, a swap space configuration, a reserved memory configuration, a memory ballooning configuration, a graphics processing unit (GPU) count, a type of a GPU scheduling policy, and a type of a GPU virtualization approach that needs to be implemented.

5. The method of claim 2, wherein the second HSRS comprises computing resources that are distinct from second computing resources of the first HSRS, wherein a computing resource of the computing resources is a central processing unit (CPU), a graphics processing unit (GPU), a data processing unit (DPU), memory, a network resource, storage spaces, or storage input/output.

6. The method of claim 2, wherein the client is a computer numerical control machine that comprises at least a sensor, wherein the sensor is one selected from a group consisting of an image capture sensor, a global positioning system sensor, a temperature sensor, a chemical detection sensor, a biological sensor, a radiation sensor, a humidity sensor, a corrosion sensor, and an audio sensor.

7. The method of claim 1, wherein the activity is a repetitive task of assembling a product.

8. The method of claim 1, wherein the first dataset comprises at least images of visual expression of the user captured over a predefined period of time.

9. The method of claim 1, wherein the second dataset specifies at least one selected group consisting of an identifier of the user, an identifier of the user's supervisor, a picture of the user, first information related to a previously assigned job to the user, a role of the user, second information that shows the user's experience, third information that shows the user's disabilities, a work time preference of the user, the user's age, and a previously recorded stress level of the user.

10. The method of claim 1, wherein the unique DI is a smart contract comprising a contractual term negotiated between the user and a user digital twin, wherein the contractual term is implemented as a subroutine that uses at least security level audit information to enforce the contractual term.

11. The method of claim 10, wherein the user digital twin is a digital model associated with the user.

12. The method of claim 1, wherein the recommendation specifies taking a break for a predefined amount of time or calling a second user to continue performing an ongoing activity on the client.

13. The method of claim 1, wherein the predetermined threshold specifies a maximum fatigue level that the user is allowed to have within a predefined period of time.

14. The method of claim 1, wherein the state of the user is at least one selected from a group consisting of a health state, a safety state, and a productivity state.

15. A non-transitory computer-readable medium comprising computer-readable program code, which when executed by a computer processor enables the computer processor to perform a method for managing a state of a user, the method comprising:
   receiving a first dataset from a client, wherein the user performs an activity using the client;
   obtaining a second dataset from a database;
   analyzing the first dataset and the second dataset to generate a unique digital identifier (DI) for the user;
   analyzing, based on a predetermined threshold, the first dataset and the second dataset to extract relevant data;
   making a determination that the predetermined threshold is violated;
   providing, based on the determination, the relevant data and the unique DI to a first infrastructure node (IN);
   in response to the providing, receiving a recommendation from the first IN to mitigate an issue associated with the user, wherein the recommendation is generated for the unique DI; and
   sending the recommendation to the client to manage the state of the user.

16. The non-transitory computer-readable medium of claim 15, wherein the client is a computer numerical control machine that comprises at least a sensor, wherein the sensor is one selected from a group consisting of an image capture sensor, a global positioning system sensor, a temperature sensor, a chemical detection sensor, a biological sensor, a radiation sensor, a humidity sensor, a corrosion sensor, and an audio sensor.

17. The non-transitory computer-readable medium of claim 15, wherein the first dataset comprises at least images of visual expression of the user captured over a predefined period of time.

18. The non-transitory computer-readable medium of claim 15, wherein the second dataset specifies at least one selected group consisting of an identifier of the user, an identifier of the user's supervisor, a picture of the user, first information related to a previously assigned job to the user, a role of the user, second information that shows the user's experience, third information that shows the user's disabilities, a work time preference of the user, the user's age, and a previously recorded stress level of the user.

19. The non-transitory computer-readable medium of claim 15, wherein the unique DI is a smart contract comprising a contractual term negotiated between the user and a user digital twin, wherein the contractual term is implemented as a subroutine that uses at least security level audit information to enforce the contractual term.

20. A system for managing a state of a user, the system comprising:
   a client;
   a first infrastructure node (IN);
   a database; and
   a second IN,
   wherein the first IN is programmed to:
      receive a first dataset from a client, wherein the user performs an activity using the client;
      obtain a second dataset from the database;
      analyze the first dataset and the second dataset to generate a unique digital identifier (DI) for the user;
      analyze, based on a predetermined threshold, the first dataset and the second dataset to extract relevant data;
      make a determination that the predetermined threshold is violated;
      provide, based on the determination, the relevant data and the unique DI to the second IN;
      in response to the provide, receive a recommendation from the second IN to mitigate an issue associated with the user, wherein the recommendation is generated for the unique DI; and
      send the recommendation to the client to manage the state of the user.

* * * * *